United States Patent

[11] 3,607,058

| [72] | Inventors | Jesse R. West;<br>Ollie Middlebrooks, both of Houston, Tex. |
|---|---|---|
| [21] | Appl. No. | 776,037 |
| [22] | Filed | Nov. 15, 1968 |
| [45] | Patented | Sept. 21, 1971 |
| [73] | Assignee | Continental Carbon Company<br>Houston, Tex. |

[54] APPARATUS AND PROCESS FOR PRODUCING CARBON BLACK
7 Claims, 3 Drawing Figs.

[52] U.S. Cl. ................................................ 23/209.4, 23/259.5
[51] Int. Cl. ............................................... C01b 31/00
[50] Field of Search ........................................ 23/209.4, 209.6, 259.5, 277

[56] References Cited
UNITED STATES PATENTS

| 2,375,795 | 5/1945 | Krejci | 23/209.8 |
| 2,976,127 | 3/1961 | Latham | 23/259.5 |
| 2,980,511 | 4/1961 | Havard | 23/209.4 |
| 3,076,695 | 2/1963 | Claassen et al. | 23/209.4 |
| 3,235,334 | 2/1966 | Helmers | 23/209.4 |

*Primary Examiner*—Edward J. Meros
*Attorneys*—L. David Trapnell and Robert U. Geib, Jr.

ABSTRACT: Apparatus and process for producing oil furnace carbon black of increased particle size by the thermal decomposition of select carbon-black-forming hydrocarbon feedstocks in an enclosed reactor having a refractory lined reaction tube with primary and secondary reaction zones. The upstream end of the reactor is a housing member with air inlet and being enclosed by an end plate, including a cylindrical baffle forming a plenum chamber communicating with perforated air diffusion plate having a central aperture mounted in flush alignment with the reaction tube. An axial burner and injection assembly extends through the end plate into the reaction tube. Air is introduced into the plenum chamber, through the diffusion plate to mix with hydrocarbon fuel for combustion and contact with the axially introduced oil feedstock in a primary reaction zone. A secondary reaction zone is established downstream by introducing preheated oxygen-containing gas from at least three tunnel burners extending through ports in the reactor housing and tube, said burners having axes focused at an angle 15° to 75° greater than and intersecting the reactor axis at the same point. The additional preheated oxygen-containing gas and combustion products introduced into the secondary reaction zone further oxidize the reaction products and surface condition the resulting carbon black. The total combustion products containing the suspended carbon black are quenched and recovered from the reactor for separation of the carbon black from said products.

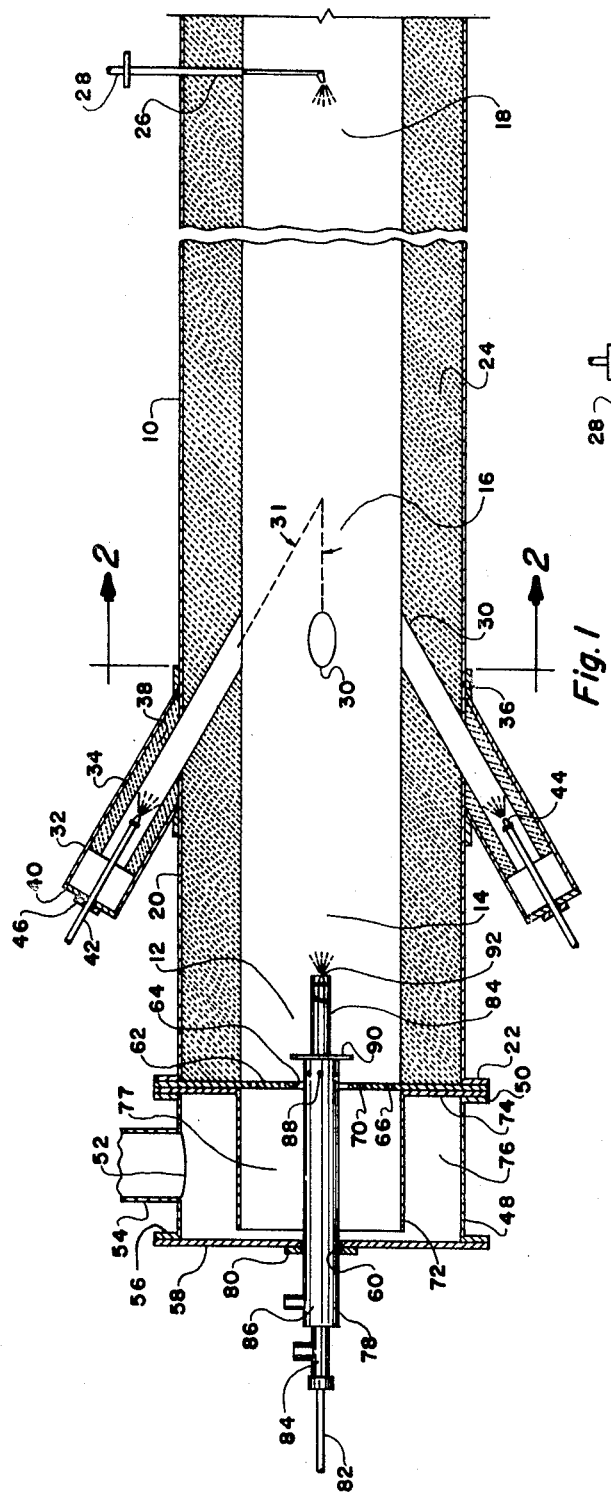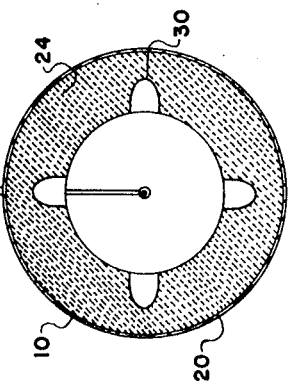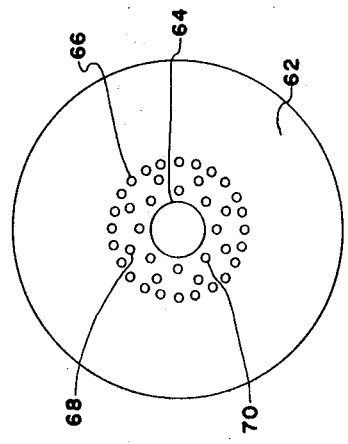
PATENTED SEP 21 1971
3,607,058
JESSE R. WEST
OLLIE MIDDLEBROOKS
INVENTORS
BY *L. David Trapnell*
ATTORNEY 3,607,058

APPARATUS AND PROCESS FOR PRODUCING CARBON BLACK

BACKGROUND OF THE INVENTION

1. Field of the Invention

The present invention relates to the manufacture of furnace carbon black which is produced basically by a partial combustion process to effect the thermal decomposition or cracking of a hydrocarbon feedstock to carbon black and the accompanying products of combustion. A suitable hydrocarbon feedstock is introduced into a heat reaction zone in the presence of a deficiency of oxygen containing gas to cause the partial combustion process to be applied to the feedstock for conversion to carbon black and furnace effluent combustion or reaction gases. The combined stream of carbon black suspended in combustion gases is subjected to quenching with a cooling medium at the appropriate point in the reaction to reduce the temperature sufficiently to terminate the carbon-black-forming reaction.

The suspending combustion gas stream is subjected to a series of treatment steps to separate the carbon black from the gas and provide for the collection of the carbon black for additional processing. This invention is concerned only with the reactor and reaction process by which the carbon black is created, so this disclosure is limited to the furnace reactor or production portion of the manufacturing process.

Carbon blacks are produced by several processes, namely the channel, furnace combustion, furnace thermal, and oil furnace processes. 1 The channel blacks are produced by impingement of small natural gas flames on the surface of metal collection elements. Channel blacks have been substantially relegated to specialty uses and ink manufacture by the other blacks produced by later developed processes, and manufacture of channel blacks is not considered or included in the scope of the present invention.

The furnace thermal process produces the coarsest carbon blacks that are generally used in applications requiring a high carbon black loading and a minimal reinforcing of the rubber. Thermal blacks have, in addition to large particle size, almost complete absence of structure. The thermal blacks are conventionally produced by the thermal decomposition of gaseous feedstock by intermittent operation of an insulated furnace utilizing heating and production cycles.

The furnace combustion process produces carbon blacks that are generally used for reinforcement of rubber used as tire carcass stocks in which low heat generation is important. These blacks are generally referred to as the gas furnace blacks and are produced by the thermal decomposition of a portion of a feedstock, with the remainder of the feedstock being combusted under oxygen deficient conditions to provide the necessary heat for the carbon forming reaction. Basically the feedstock for furnace combustion blacks is natural gas, however, the practice of enriching the feedstock by injecting liquid hydrocarbon is becoming more prevalent as the natural gas fields become depleted.

The oil furnace process produces the carbon blacks that are used more than all others by the manufacturers of rubber for tires and related applications. These rubber reinforcing blacks are produced by the thermal decomposition or cracking of hydrocarbon feedstocks that are at least partially liquid at normal ambient conditions and have a substantial aromatic content. The feedstock is introduced into an enclosed furnace to be contacted with the heat of decomposition generated by the separate combustion of a mixture of fuel and oxygen-containing gas to form the carbon black from the oil feedstock. The characteristics of the oil furnace blacks produced in the reactor are dependent upon combustion conditions, stream flow pattern, composition of the hydrocarbon feedstock and other raw materials, reaction time, and operating conditions within the reactor during production.

The presently disclosed invention is directed particularly to the production of oil furnace carbon blacks.

2. Description of the Prior Art

Apparatus for the production of oil furnace carbon black comprises for purposes of the present disclosure the reactor and auxiliary components for its operation to the point in the reactor of which termination of the carbon-black-forming reaction is completed. The prior art applicable to this general area thus defined, is substantial, but pointedly does not teach or anticipate the present disclosure.

Oil furnace carbon black reactors are generally of cylindrical elongate configuration and are disposed horizontally. The reactor conventionally consists of axially aligned zones of combustion, reaction and quench; with these various zones having different longitudinal dimensions and frequently having different diameters. The fuel and oxygen-containing gas mixture is introduced in varied patterns into the combustion zone, then the combustion products and heat are applied to the feedstock introduced into the reaction zone. The carbon black reaction is terminated in the quench zone downstream of the reaction zone, and the black exits the reactor for additional processing.

SUMMARY OF THE INVENTION

The invention of the present application includes apparatus and process for the production of furnace carbon black in said apparatus by the thermal decomposition of a suitable hydrocarbon feedstock in an elongate cylindrical reactor having coaxially aligned sections, the first or downstream section being lined with refractory material. Intermediate the first housing section ends, at least three focus ports extend through said reactor housing and lining to a tunnel of a housing enclosing a fuel burner assembly, said ports having axes set at an angle from said reactor axis to intersect at substantially the same downstream point on said axis. The second or upstream reactor section has an oxygen-containing gas input port for movement of an oxygen-containing gas through the annular space defined by a cylindrical baffle coaxially mounted within said second reactor section. The second section is at its upstream end enclosed by a centrally apertured end plate. An oxygen-containing gas is passed by flow in a longitudinal direction to a combustion zone and mixed with a combustion fuel. The mixture is combusted to form gases which are brought into contact with a carbon-black-forming feedstock axially introduced into the primary reaction zone of the reactor for passage into the secondary reaction zone of the reactor. Preheated oxygen-containing gas and combustion products are introduced through the focus ports of said first reactor housing section and reactor lining into contact with the partially formed black and combustion products from the primary reaction zone. The reaction products of carbon black and combustion products pass to the quench zone and are withdrawn from the reactor.

BRIEF DESCRIPTION OF THE DRAWING

The annexed drawing sets forth in detail illustrative views of the invention, wherein like reference numerals designate like parts, as follows:

FIG. 1 represents a side elevation, partially in longitudinal section illustrating an oil furnace reactor apparatus of the present invention;

FIG. 2 represents a cross-sectional view of a portion of the apparatus of Figure 1 along line 2—2; and FIG. 3 represents a full view of a reactor element, specifically the diffusion plate 62.

DESCRIPTION OF PREFERRED EMBODIMENTS

The present invention may be readily understood from the following detailed description and by referring to the drawing, particularly FIG. 1. diameter. The first housing 20 has a quench port 26 extending through the carbon black reactor is generally designated by reference 10 and within the reactor there is a combustion zone 12, a primary zone 14, a secondary reaction zone 16, and the quench zone 18. The reactor 10 is for purposes of description more readily referred to by a first housing section 20 which forms the downstream end of the reactor. The housing section 20 has a flange 22 at its upstream end adapted to be affixed to the remainder of the reactor 10, and within section 20 there is an unobstructed refractory lining 24 which has a uniform diameter. refractory lining at a downstream point and a suitable quench means 28 disposed therein for the purpose of terminating the carbon-black-forming reaction.

The refractory lining 24 has four focus ports 30 extending through housing 20 into communicating with secondary reaction zone 16. The description of these focus ports 30 and the relation of the same with regard to the other components of the reactor can be understood by reference to FIG. 2 of the drawing. These ports 30 are placed, in regard to longitudinal relation within first housing section 20 at a point intermediate of the primary reaction zone 14 and the quench zone 18, preferably in the upstream one-half of this intermediate portion of section 20. Focus ports 30 are four in number in the preferred embodiment, however the number of such ports must only be at least three, in order to achieve the desired focused and balanced flow patterns downstream through the reactor. The longitudinal placement and angle of disposition for the focus ports must be accomplished to provide a balanced flow of gas from all ports conveying at a substantially the same point on the axis of reactor 10. Longitudinal placement of the ports is accomplished by disposing the intersection of axes at interior periphery of reactor lining in the same plane perpendicular to the reactor axis. Accordingly, the axes of the ports are in planes intersecting the reactor axis and the angle of these axes, generally designated at 31, is defined in relation to the port axes and reactor axis as measured in the common intersecting plane. The angle 31 of the axes of ports 30 is to be in the range from 15° to 75°, preferably from 30° to 60°, depending upon the particular black to be produced. This arrangement of the focus ports, together with a substantially equal input from each, provides inputs at locations required to establish and maintain the focused reinforced flow downstream through the reactor.

A tunnel burner means 32, coaxially aligned with each focus port 30, is comprised of a cylindrical housing 34 affixed to the exterior of first housing section 20 by flange element 36. The burner housing 34 has a cylindrical refractory lining 38 having an interior diameter substantially equal to port 30. The housing 34 is enclosed by a centrally apertured closure plate 40 affixed to said housing by suitable means, with a combustible mixture conduit 42 having a burner device 44 attached and extending into said tunnel means 32 being affixed to said closure plate 40 by a packing gland 46. The combustible mixture of fuel and an excess amount of oxygen-containing gas required to combust said fuel is introduced by conduit 42 into the tunnel means 32 for ignition and combustion with passage of the resultant heated oxidizing gas stream of combustion products and excess oxygen-containing gas into port 30. Port 30 is adapted to receive said gas stream for focused introduction into the first housing section 20 to establish the secondary reaction zone 16 to combust the hydrogen and carbon monoxide gases from the reaction products formed in the primary reaction zone 14 and to furnish further heat for the carbon-black-treating reaction. The focused introduction of the additional gas stream forms a reinforced flow downstream of the primary reaction zone creating turbulence which cause the partially formed black to more rapidly be contacted by the hot oxidizing gases. The creation of additional heat and turbulent flow patterns within the reactor are described more fully hereinbelow.

Upstream from the first housing section 20 is a second housing section 48 having a flange 50 at its downstream end for fixation with flange 22. An oxygen-containing gas or air input port 52 extends through the side of housing section 48 at a point from the middle to the downstream end and said port 52 has a suitable air input conduit 54 attached thereto and connected to a blower and optional preheater, not shown. At the upstream end of this second housing section 48 is flange 56 to which is attached an end plate 58 having a central aperture 60 thereby forming a suitable enclosure of the reactor 10.

There is affixed between the first and second housing sections 20 and 48 a circular diffusion plate 62 as set forth in more detail in FIG. 3 of the drawing. The diffusion plate has a central aperture 64, adapted to accommodate an injection and burner assembly described below, and the plate has a diameter sufficient to be affixed as between flanges 22 and 50 in a suitable manner. There are a series of perforations extending through plate 62 about central aperture 64 to allow communication from second housing section 48 into the combustion zone 12 within refractory lining 24 of said first housing section 20. The perforations are comprised of perforations 66 spaced to pass through plate 62 adjacent the inner wall of lining 24 with other perforations such as 68 and 70 disposed interiorly toward aperture 64. The pattern and number of perforations through plate 62 can be varied to meet individual situations without departing from the scope of the present invention.

There is coaxially affixed and aligned within housing section 48, a cylindrical baffle 72 having a suitable flange 74 at the downstream end, said flange 74 communicating with flanges 22 and 50 and the edge of plate 62 enabling the flush assembly by suitable means of housing section 20 and 48, and select reactor components contained therein. The mounting of cylindrical baffle 72 thereby establishes an annular zone 76 extending between said baffle and second housing section 48, said zone having a thickness from one-half to equal the thickness of lining 24, thereby defining a zone or plenum chamber 77 which forms a directional flow control means for the combustion air. Baffle 72 extends upstream in a spaced relationship with end plate 58 thereby defining the flow path from port 52 into chamber 77. The air, preheated if desired, passes through input conduit 54 through port 50 into annular zone 76 against baffle 72 for movement toward end plate 58 about the end and into chamber 77 for the purpose of establishing a longitudinal flow direction for the air or other oxygen-containing gas.

The reactor is equipped with a suitable axial feedstock injection and burner assembly 78, such as is disclosed more fully in copending U. S. application Ser. No. 602,002, filed Dec. 15, 1966, now U.S. Pat. No. 3,443,761, which extends through the central apertures of end plate 58 and diffusion plate 62 to be mounted by packing means 80. Particularly there are coaxial conduits for the introduction of the materials required for the carbon-black-forming reaction, specifically a feedstock conduit 82 enclosed by an axial air conduit 84, and combustion fuel conduit 86, said fuel conduit having burner ports 88 located behind a suitable flame holder disc 90. The carbon-black-forming feedstock is injected through conduit 82 for dispersion into the primary reaction zone by a nozzle 92. The assembly is adapted to always extend the flameholder disc 90 through the plate aperture 64 with reasonable tolerance to maintain the ports 98 within the refractory lining 24 of housing section 20, so the feedstock is injected into the reaction zone 14 downstream from combustion zone 12.

A preferred embodiment of the apparatus disclosed as the present invention comprises a first reactor housing section about 40 feet in length with the refractory lining inner diameter of 25inches, and 25 focus ports of 4 inches diameter. The angle of the focus ports is 30° from the reactor axis, said ports being placed about 15 feet downstream into said lining. The second housing chamber has a diameter greater than its length and the baffle has an inner diameter of 25 inches.

In operating the subject apparatus in accordance with the process of the present invention, the conditions of combustion are established in the combustion zone 12 of the carbon black reactor by introducing an oxygen-containing gas, such as air, through the conduit 54 into the annular space 76 of about baffle 72 and through the central aperture 64 and perforations 66, 68 and 70 of diffusion plate 62 into the combustion zone 12 wherein it mixes with combustion fuel being introduced by conduit 86 of the burner assembly 78 through ports 88 to form a mixture that is ignited for combustion within zone 12.

The fuel for combustion can be any hydrocarbon gas such as natural gas, various petroleum refinery off-gas streams, or normally liquid hydrocarbons capable of being substantially vaporized. A typical volume analysis of a preferred natural gas being as follows:

| | |
|---|---|
| ethane | 72.09% |
| Ethane | 9.38% |
| Propane | 6.24% |
| Isobutane | 0.46% |
| N-Butane | 1.08% |
| Isopentane | 0.22% |
| N-Pentane | 0.25% |
| N-Hexane | 0.18% |
| Nitrogen | 9.74% |
| Helium | 0.28% |
| Carbon Dioxide | 0.08% |

The oxygen-containing gas for combustion can be air, air enriched with oxygen, or oxygen. The hydrocarbon fuel and oxygen-containing gas are introduced in volumes for a stoichiometric ratio sufficient to provide an amount of oxygen-containing gas slightly in excess of the amount required for complete combustion of the fuel, with the excess oxygen-containing gas being carried to the reaction zone for combustion of a minor portion of the hydrocarbon feedstock. The combustion of the foregoing mixture to substantial completion occurs at a point which basically defines the downstream limit of the combustion zone within the reactor as evidenced by the maximum heat generation, thus setting the point for commencement of the initial limit of the reaction zone.

The hydrocarbon feedstock capable of forming a suitable carbon black depends upon the reactor design and operating conditions, however such feedstock is generally characterized as a highly aromatic hydrocarbon, as derived from petroleum-coal-refining operations, free of deleterious materials, and generally at least partially liquid at ambient conditions. A preferred and suitable feedstock for the manufacture of carbon black in a furnace reactor has the following specifications:

| | |
|---|---|
| Gravity, °API @ 60° F. | 1 .1 |
| Viscosity @ 122° F., SSF | 113 .7 |
| BS&W% | 0 .1 |
| Ash% | 0 .03 |
| Asphaltenes % | 8 .60 |
| Sulfur, % | 0 .81 |
| Carbon, % | 91 .58 |
| Hydrogen, % | 8 .63 |
| Kinematic Vis. Centistokes | 240 |
| Characterization Factor | 12 .5 |
| Bu. Mines Correlating Index | 117 .6 |
| Distillation Range, °F. | |
| IBP | 497 |
| 10% | 624 |
| 20% | 685 |
| 30% | 727 |
| 40% | 767 |
| 50% | 810 |
| 60 % | 857 |

An example of the process to be employed in the apparatus described herein for production a desired carcass grade oil furnace black is described below. The formation of a combustible mixture is accomplished in the combustion zone by introducing 75,000 s.c.f.h. (standard cubic feet per hour) of air and 5,800 s.c.f.h. of natural gas which are combusted for introduction into the primary reaction zone. The hydrocarbon feedstock oil having characteristics comparable to those previously set forth is preheated to 300° F. and atomized through the nozzle of the burner and injection assembly at a rate of 220 gallons per hour, with a concurrent introduction of axial air about said feedstock at the rate of 6,000 s.c.f.h. Separately a combustible mixture of 50,000 s.c.f.h. of air and 3,000 s.c.f.h. of natural gas are introduced into the tunnel burner means for combustion to provide the oxidizing heated gas stream introduced in a focused manner into the secondary reaction zone. The carbon-black-forming reaction was quenched at a point about 37 feet downstream from the diffusion plate by injection of water to a temperature of 650° F. and passed to the black recovery system. Black produced in accordance with the above procedure provides a black with a desirably larger particle size, as compared to black produced on the same reactor without utilizing the secondary reaction zone.

The combustion fuel and oxygen-containing gas upon being introduced into the combustion zone of the reactor and ignited are continuously introduced and combustion is continued until such time as the reactor is heated to a point of temperature stabilization by passage of the hot combustion products or gases through the various zones of the reactor. The hydrocarbon feedstock, with optional preheating, is then passed into the primary reaction zone through the injection assembly in a generally axial manner with regard to said reaction zone by spraying the same through a nozzle on the end of the feedstock injection conduit, said nozzle having a spray angle of a conventional nature in the order of 30° to 80° from the axis thereof. The carbon-black-forming reaction commences at the point of introducing feedstock into the reactor and this reaction in the primary zone fixes the particle size characteristic of the black product. The particle size is basically controlled by the feedstock to air ratio, with a higher ratio providing black of larger particle size. Concurrently, additional combustion fuel and an excess amount of oxygen-containing gas, such as air, required for the combustion of said fuel are introduced into the tunnel burner means for combustion to form heated oxidizing gas streams introduced into the secondary reaction zone. The stream of reaction products passes from the primary to the secondary reaction zone for treatment by focused heated oxidizing gas streams where the added heat and the oxidizing reaction completes the carbon-forming reaction. This secondary reaction with the oxidizing gas stream permits a reduced volume of oxygen-containing gas in the primary reaction zone and increases the feedstock to air ratio at the time of establishing the larger particle size. The introduction of the heated oxidizing gas stream through the downstream focus ports increases the stream velocity through the reactor and creates a condition of turbulent motion for the reaction products in which the carbon particles are surface treated to reduce the tar content and impart other desirable characteristics to the black.

We claim:

1. An apparatus for the production of oil furnace carbon black by the thermal decomposition of carbon-black-forming hydrocarbon feedstock which comprises:
   a. an elongate cylindrical housing having a first section and a second section at the downstream and upstream ends respectively of said reactor coaxially aligned in substantially horizontal communication;
   b. a refractory lining having a uniform inner diameter enclosed within said first housing section;
   c. at least three focus ports extending through said first section housing and lining intermediate the ends of said first housing section, said ports having axes set at an angle in the range of 15° to 75° from said reactor axis to intersect at substantially the same downstream point on said axis;
   d. a tunnel burner means communicating with each of said ports;
   e. an air input port extending through said second housing section, including a conduit communicating with said port;
   f. a centrally apertured end plate enclosing said second housing section;
   g. a cylindrical baffle coaxially mounted within said second housing section having a diameter substantially equal to the interior of said first section lining and extending from the downstream end of said second section into spaced relation with said end plate establishing an annular zone between said second housing section and said baffle;
   h. a centrally apertured diffusion plate having a series of perforations about said aperture coaxially mounted between said first and second housing sections; and i. a burner assembly and feedstock injection means axially mounted through the central apertures of said end plate and said diffusion plate into said reactor.

2. The apparatus as set forth in claim 1 wherein there are four focus ports spaced equidistantly about said first housing section and lining.

3. The apparatus as set forth in claim 1 wherein the focus port axes are set at an angle in the range from 30° to 60° from said reactor axis.

4. The apparatus as set forth in claim 1 wherein the axial length of the second section housing is less than the diameter of said second section housing.

5. The apparatus as set forth in claim 1 wherein said cylindrical baffle has an inner diameter substantially equal to the inner diameter of said first section refractory lining.

6. The apparatus as set forth in claim 1 wherein the air input port extends radially of the reactor axis.

7. A process for the production of oil furnace carbon black by the thermal decomposition of a carbon-black-forming hydrocarbon feedstock which comprises:
   a. introducing a combustion fuel into the combustion zone of a reactor;
   b. radially introducing an oxygen-containing gas into an annular space about a cylindrical baffle coaxially disposed in a carbon black reactor for passage through the interior of said baffle and a diffusion plate forming longitudinal flow;
   c. passing said gas into the combustion zone of said reactor forming a combustible mixture with said fuel;
   d. combusting said mixture in said zone and passing the combustion gases into the primary reaction zone of said reactor;
   e. introducing said hydrocarbon feedstock into said reaction zone into contact with said combustion gases in an unobstructed primary reaction zone;
   f. introducing an additional combustion fuel and an excess amount of oxygen-containing gas required for combustion of said fuel into at least three tunnel burners having axes focused at an angle in the range of 15° to 75° from the reactor axis and intersecting at substantially the same downstream point on said axis located at a point downstream of said primary reaction zone;
   g. combusting said mixture and introducing the heated oxidizing gas stream of combustion products and excess oxygen-containing gas by focused flow into a secondary reaction zone downstream of said primary reaction zone;
   h. passing the reaction products from said primary reaction zone into said secondary reaction zone into contact with said heated gas stream;
   i. completing the reaction of said products with said heated gas stream in the secondary reaction zone;
   j. passing the reaction products from said secondary reaction zone to a quench zone of said reactor for contact with a quenching medium; and
   k. recovering the quenched reaction products from said reactor.

PO-1050
(5/69)

UNITED STATES PATENT OFFICE
CERTIFICATE OF CORRECTION

Patent No. 3,607,058           Dated September 21, 1971

Inventor(s) Jesse R. West and Ollie Middlebrooks

It is certified that error appears in the above-identified patent and that said Letters Patent are hereby corrected as shown below:

Column 2, line 70 through Column 3, line 8 should read as follows:
"particularly Figure 1. The furnace carbon black reactor is generally designated by reference 10 and within the reactor there is a combustion zone 12, a primary zone 14, a secondary reaction zone 16, and the quench zone 18. The reactor 10 is for purposes of description more readily referred to by a first housing section 20 which forms the downstream end of the reactor. The housing section 20 has a flange 22 at its upstream end adapted to be affixed to the remainder of the reactor 10, and within section 20 there is an unobstructed refractory lining 24 which has a uniform diameter. The first housing 20 has a quench port 26 extending through the refractory lining at a downstream point and a suitable quench means 28 disposed therein for the purpose of terminating the carbon black forming reaction."

Column 4, line 61, after "and" delete "25" and insert --4-- therefor.

Column 5, line 34, after "petroleum" insert --or--.

Signed and sealed this 21st day of March 1972.

(SEAL)
Attest:

EDWARD M. FLETCHER, JR.       ROBERT GOTTSCHALK
Attesting Officer                Commissioner of Patents